United States Patent
Kim et al.

(10) Patent No.: US 10,078,170 B2
(45) Date of Patent: Sep. 18, 2018

(54) LIGHT CONVERSION MEMBER AND DISPLAY APPARATUS INCLUDING THE SAME

(71) Applicant: Samsung Display Co., LTD., Yongin-si, Gyeonggi-Do (KR)

(72) Inventors: Donghoon Kim, Suwon-si (KR); Myeong-ju Shin, Seoul (KR); Junwoo You, Seongnam-si (KR); Seunghwan Chung, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 96 days.

(21) Appl. No.: 15/056,249

(22) Filed: Feb. 29, 2016

(65) Prior Publication Data

US 2016/0370526 A1 Dec. 22, 2016

(30) Foreign Application Priority Data

Jun. 16, 2015 (KR) .................. 10-2015-0085332

(51) Int. Cl.
  *F21V 7/04* (2006.01)
  *F21V 8/00* (2006.01)
  *G02B 5/23* (2006.01)

(52) U.S. Cl.
  CPC ............... *G02B 6/005* (2013.01); *G02B 5/23* (2013.01); *G02B 6/0051* (2013.01)

(58) Field of Classification Search
  CPC ....... G02F 2202/36; G02B 6/005; G02B 5/23; G02B 6/0051
  See application file for complete search history.

(56) References Cited

U.S. PATENT DOCUMENTS

| 7,819,539 B2 * | 10/2010 | Kim ................. H01L 33/507 313/110 |
| 2005/0135079 A1 * | 6/2005 | Yin Chua ............ B82Y 10/00 362/12 |
| 2008/0117620 A1 | 5/2008 | Hama et al. |
| 2011/0068322 A1 | 3/2011 | Pickett et al. |
| 2012/0113672 A1 | 5/2012 | Dubrow et al. |
| 2013/0075692 A1 | 3/2013 | Naasani et al. |
| 2014/0233212 A1 | 8/2014 | Park |

FOREIGN PATENT DOCUMENTS

| JP | 2013203822 A | 10/2013 |
| KR | 1020120135999 A | 12/2012 |
| KR | 1020130000508 A | 1/2013 |

* cited by examiner

*Primary Examiner* — Evan Dzierzynski
(74) *Attorney, Agent, or Firm* — Cantor Colburn LLP (57) ABSTRACT

A light conversion member includes a base substrate, a first light conversion layer disposed on the base substrate and including a plurality of first quantum dots that converts first light into light with a first color, a second light conversion layer disposed between the base substrate and the first light conversion layer and including a plurality of second quantum dots that converts the first light into light with a second color. Each of the first quantum dots includes a first core that converts the first light into light with the first color; a first shell surrounding the first core and including an organic material; and a second shell surrounding the first shell and including an inorganic material.

19 Claims, 7 Drawing Sheets

LIGHT CONVERSION MEMBER AND DISPLAY APPARATUS INCLUDING THE SAME

This application claims priority to Korean Patent Application No. 10-2015-0085332, filed on Jun. 16, 2015, and all the benefits accruing therefrom under 35 U.S.C. § 119, the content of which in its entirety is herein incorporated by reference.

BACKGROUND

The disclosure herein relates to a light conversion member and a display apparatus including the light conversion member.

In general, a liquid crystal display apparatus typically includes a display panel including a plurality of pixels for generating an image, and a backlight unit for providing the display panel with light. The pixels of the display panel adjust the transmissivity of the light received from the backlight unit and display an image.

Recently, a light conversion member including quantum dots has been used to enhance the efficiency of the light provided to the display panel. In general, quantum dots include core particles and protective shells surrounding the core particles. The light conversion member may convert the light which is generated from a light source and has a predetermined color, into white light. For example, the light conversion member may convert the blue light generated from a light source into white light.

The white light generated from the light conversion member is provided to the display panel, and pixels of the display panel may display an image by using the white light provided from the light conversion member.

SUMMARY

The present disclosure provides a light conversion member configured to reduce a manufacturing cost and a thickness thereof, and a display apparatus including the light conversion member.

An embodiment of the inventive concept provides a light conversion member, including: a base substrate; a first light conversion layer disposed on the base substrate and including a plurality of first quantum dots which converts first light into light with a first color; and a second light conversion layer disposed between the base substrate and the first light conversion layer, and including a plurality of second quantum dots which converts the first light into light with a second color. In such an embodiment, each of the first quantum dots includes a first core which converts the first light into light with the first color; a first shell which surrounds the first core and includes an organic material; and a second shell which surround the first shell and includes an inorganic material.

In an embodiment, each of the second quantum dots may include a second core which converts the first light into light with a second color; and a first shell which surrounds the second core and includes an organic material.

In an embodiment, a size of the first core may be greater than a size of the second core.

In an embodiment, the first color may be red, the second color may be green, and the first light may be blue light.

In an embodiment, each of the first and second cores includes a core particle including a semiconductor particle of Group II-IV or Group III-V; and a protective shell which surround the core particle.

In an embodiment, a first diffusion layer disposed under the base substrate; a second diffusion layer disposed over the first light conversion layer; and a barrier layer disposed between the base substrate and the second light conversion layer may be further included. In such an embodiment, the barrier layer may include an inorganic material.

In an embodiment, the second shell may include a silicon oxide.

In an embodiment, each of the first and second light conversion layers may further include a resin which accommodates the first or second quantum dots.

In an embodiment, each of the second quantum dots may include: a second core which converts the first light into light with a second color; and a first shell which surrounds the second core and includes an organic material; and a second shell which surrounds the first shell and includes an inorganic material.

In an embodiment of the inventive concept, a light conversion member includes: a first diffusion layer; a base substrate disposed on the first diffusion layer; a barrier layer disposed on the base substrate; a first light conversion layer disposed on the barrier layer, and including a plurality of first bulk units which converts first light into light with a first color; and a second light conversion layer disposed between the base substrate and the first light conversion layer and including a plurality of second quantum dots which convert the first light into light with second color. In such an embodiment, each of the first bulk units includes a plurality of first quantum dots and a second shell which accommodates the first quantum dots, each of the plurality of first quantum dots includes a first core which converts the first light into light with the first color, and a first shell which surrounds the first core, the first shell includes an organic material, and the second shell includes an inorganic material.

In an embodiment of the inventive concept, a light conversion member includes: a base substrate; a first light conversion layer disposed on the base substrate, and including a plurality of first bulk units which converts first light into light with a first color; and a second light conversion layer disposed under the base substrate and including a plurality of second bulk units which convert the first light into light with second color; and a first diffusion layer disposed under the second light conversion layer. In such an embodiment, each of the first bulk units includes a plurality of first quantum dots and a second shell which accommodates the first quantum dots, where each of the plurality of first quantum dots includes a first core which converts the first light into light with the first color, and a first shell which surrounds the first core. In such an embodiment, each of the second bulk units includes a plurality of second quantum dots and a second shell which accommodates the second quantum dots, where each of the plurality of first quantum dots includes a second core which converts the first light into light with the second color; and a first shell which surrounds the second core. In such an embodiment, each of the first shells of the first and second bulk units includes an organic material, and each of the second shells of the first and second bulk units includes an inorganic material.

In an embodiment of the inventive concept, a display apparatus includes: a light source which generates a first light; a light guide late which upwardly guides the first light; a light conversion member disposed on the light guide plate and which converts the first light into a second light; and a display panel which displays an image using the second light received from the light conversion member. In such an embodiment, the light conversion member includes a base substrate; a first light conversion layer disposed on the base substrate and including a plurality of first quantum dots which converts first light into light with a first color; and a second light conversion layer disposed between the base substrate and the first light conversion layer and including a plurality of second quantum dots which converts the first light into light with a second color. In such an embodiment, each of the first quantum dots includes a first core which converts the first light into light with the first color; a first shell which surrounds the first core and including an organic material; and a second shell which surround the first shell and including an inorganic material. In such an embodiment, each of the second quantum dots including a second core which converts the first light into light with the second color; and a first shell which surrounds the second core and including an organic material.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

It will be understood that when an element or a layer is referred to as being 'on' another element or layer, it can be directly on the other element or layer, or intervening layers or elements may also be present. On the contrary, when an element is referred to as being 'directly on' another element or layer, it will be understood that intervening layers or elements are not present. The term 'and/or' includes any and all combinations of one or more of the associated listed item.

The terms "below", "beneath", "lower", "above" and "upper" representing spatial relativity may be used to easily describe the correlation between an element or component and another element or component as shown in the drawings. The terms representing spatial relativity should be understood as terms including different directions of an element in use or in operation in addition to the direction shown in the drawings. Like reference numerals refer to like elements throughout.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, components, and/or sections, these elements, components, and/or sections should not be limited by these terms. These terms are only used to distinguish one element, component, and/or sections from another element, component, and/or sections. Thus, for example, a first element, a first component or a first section discussed below could be termed a second element, a second component or a second section without departing from the teachings of the present invention.

Embodiments described in the disclosure are described with reference to plan views and cross-sectional views that are ideal, schematic diagrams of the present invention. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present invention.

Hereinafter, exemplary embodiments will be described in detail with reference to the accompanying drawings.

Figure 1:
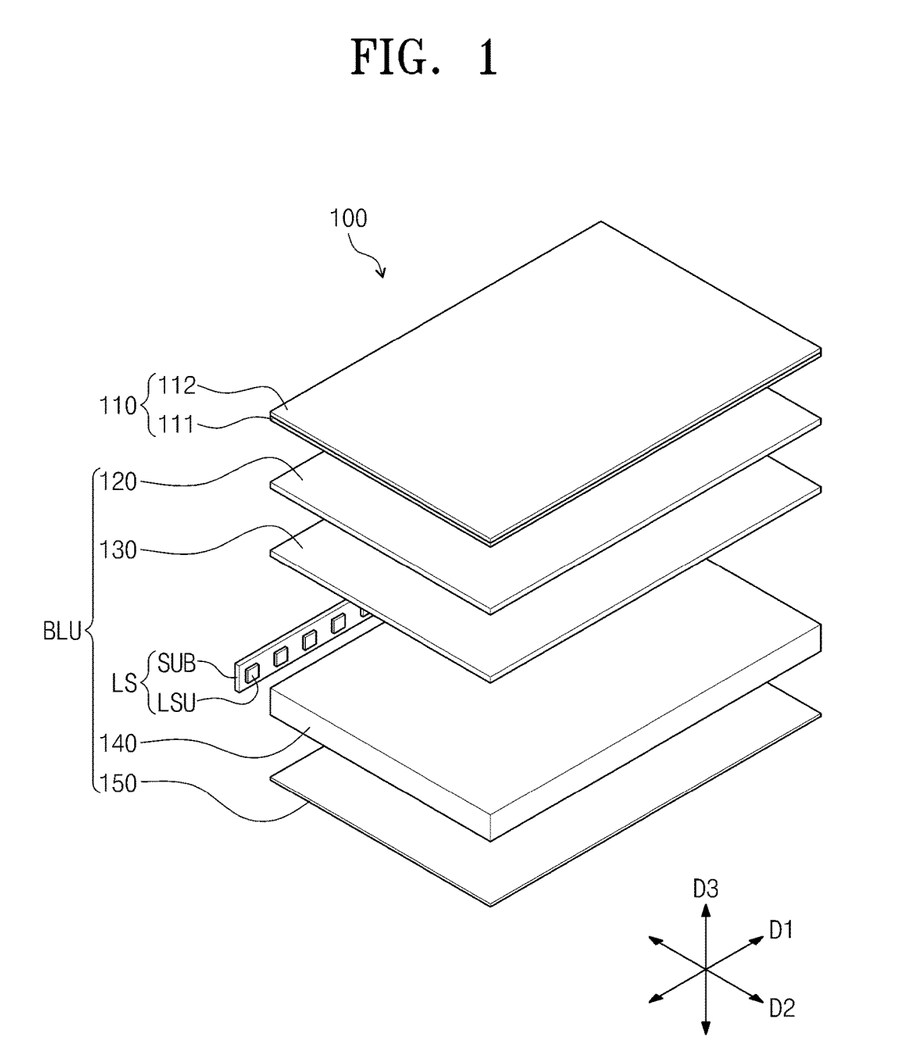
FIG. 1 is an exploded perspective view illustrating a display apparatus according to an embodiment of the inventive concept.

FIG. 1 is an exploded perspective view illustrating a display apparatus according to an embodiment of the inventive concept.

Referring to FIG. 1, an embodiment of a display apparatus 100 includes a display panel 110 that displays an image using light, and a backlight unit BLU that generates light and provides the display panel with the light. The backlight unit BLU may be disposed below or in a rear of the display panel 110 and provides the display panel 110 with the light.

The display panel 110 may be a liquid crystal display panel including a liquid crystal layer. In one embodiment, for example, the display panel 110 may include a first substrate 111 on which a plurality of pixels (not shown) that displays an image using light are disposed, a second substrate 112 opposite to, e.g., facing, the first substrate 111, and a liquid crystal layer (not shown) disposed between the first and second substrates 111 and 112.

The backlight unit BLU may be an edge-type backlight unit. The backlight unit BLU includes an optical sheet 120, a light conversion member 130, a light guide plate 140, a light source LS, and a reflective sheet 150.

The display panel 110, the optical sheet 120, the light conversion member 130, the light guide plate 140, and the reflective sheet 150 have a long side in a first direction D1, and a short side in a second direction D2 which crosses the first direction D1.

The light conversion member 130 is disposed over the light guide plate 140. The reflective sheet 150 is disposed under the light guide plate 140, and the optical sheet 120 is disposed over the light conversion member 130. The display panel 110 is disposed over the optical sheet 120.

The light source LS is disposed adjacent to a side surface of the light guide plate 140 in the second direction D2. The light source LS extends in the first direction D1. Herein, "a surface in a direction" may mean "a surface perpendicular to the direction". The light source LS generates a first light having a predetermined color. The first light may be blue light.

The light source LS includes a substrate SUB extending in the first direction D1, and a plurality of light source units LSU disposed or mounted on the substrate SUB. The light source units LSU may be disposed at regular intervals in the first direction D1. The light source units LSU may be disposed to face the side surface of the light guide plate 140 in the second direction D2.

The light source units LSU may generate a first light having a predetermined color. In one embodiment, for example, the light source unit LSU may be a blue light emitting device ("LED") that generates blue light as the first light.

The first light generated from the light source units LSU is provided to the side surface of the light guide plate 140 in the second direction D2. The light guide plate 140 guides the first light provided from the light source units LSU to propagate toward the display panel 110 disposed thereover in a third direction D3. The third direction D3 may be perpendicular to the first and second directions D1 and D2.

The first light is provided to the light conversion member 130 through the light guide plate 140. The reflecting plate 150 upwardly reflects the light emitted down from the light guide plate 140.

The light conversion member 130 converts the first light received from the light guide plate 140 into a second light. In an embodiment, the second light may be white light. In such an embodiment, the light generated from the backlight unit BLU may be white light.

The light conversion member 130 includes quantum dots, which have predetermined sizes based on the wavelength of light generated from the light sources LS, to generate white light as the second light. In one embodiment, for example, when the light source LS generates blue light, the light conversion member 130 may include quantum dots having a predetermined size to absorb the light with a blue wavelength band and to emit the light with a green wavelength band, and quantum dots having a predetermined size to absorb the light with a blue wavelength band and to emit the light with a red wavelength band.

The quantum dots of the light conversion member 130 absorb the blue light received from the light source LS to convert the blue light into the light with a green or red wavelength band. A portion of the blue light may not be absorbed by the quantum dots. Accordingly, lights of blue, green and red wavelengths are mixed with each other in the light conversion member 130 such that white light may be generated from the light conversion member.

The optical sheet 120 includes a diffusion sheet (not shown) and a prism sheet (not shown) disposed over the diffusion sheet. The diffusion sheet may diffuse the light received from the light conversion member 130.

The prism sheet may collect the light diffused from the diffusion sheet toward an upward direction perpendicular to a surface thereof, e.g., an upper surface thereof. The light passed through the prism sheet having a uniform brightness distribution proceeds upward and is provided to the display panel.

The pixels in the display panel 110 may display an image using the second light received from the backlight unit BLU.

In an embodiment of the inventive concept, the backlight unit BLU may be an edge-type backlight unit, as described above, but the embodiment of the inventive concept is not limited thereto. In an alternative embodiment, the backlight unit BLU may be a direct-type backlight unit. In such an embodiment, the light guide plate may be omitted, and a plurality of light sources may be disposed under the reflective sheet. In such an embodiment, a plurality of holes may be defined in the reflective sheet, and the light sources are inserted into the holes. In such an embodiment, where the light sources are inserted into the holes in the reflective sheet, the light sources may be thicker than the reflective sheet.

In an embodiment, where the backlight unit BLU is a direct-type backlight unit, the light sources upwardly emit light, and the reflective sheet upwardly reflects the light emitted to rear sides of the light sources.

Hereinafter, various embodiments of the light conversion member 130 will be described.

Figure 2:
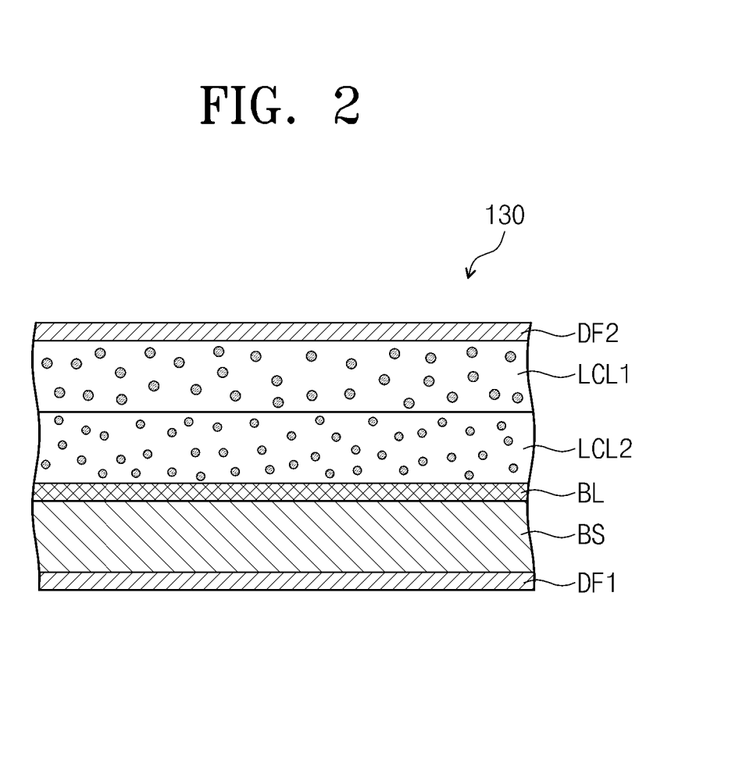
FIG. 2 is a cross-sectional view illustrating a cross-section of a light conversion member according to an embodiment of the inventive concept.
Figure 3:
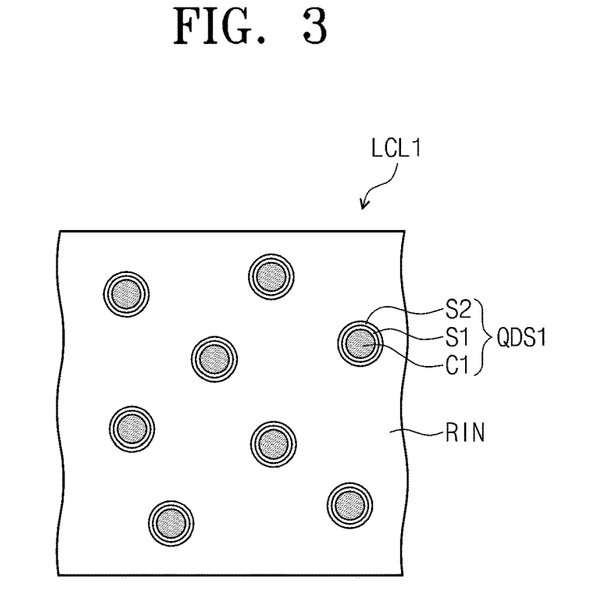
FIG. 3 is an enlarged view of a portion of a first light conversion layer illustrated in FIG. 2.
Figure 4:
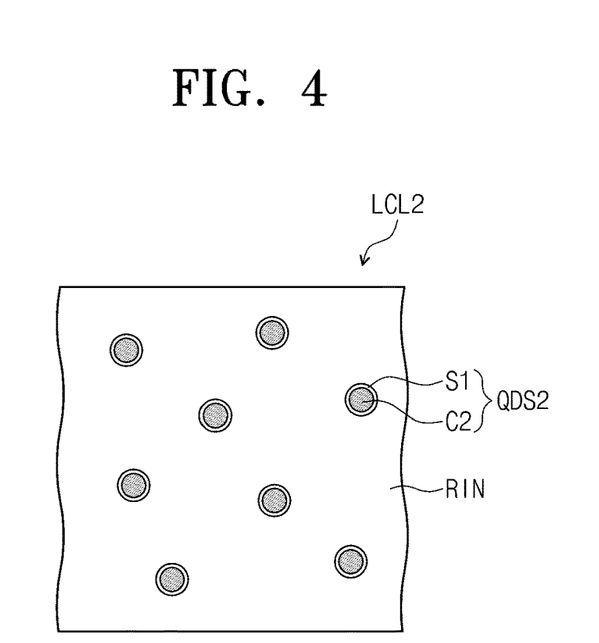
FIG. 4 is an enlarged view of a portion of a second light conversion layer illustrated in FIG. 2.

FIG. 2 is a cross-sectional view illustrating a cross-section of a light conversion member according to an embodiment of the inventive concept. FIG. 3 is an enlarged view of a portion of a first light conversion layer illustrated in FIG. 2. FIG. 4 is an enlarged view of portion of a second light conversion layer illustrated in FIG. 2.

Referring to FIGS. 2, 3, and 4, in an embodiment, the light conversion member 130 includes a first diffusion layer DF1, a second diffusion layer DF2, a base substrate BS, a barrier layer BL, a first light conversion layer LCL1, and a second light conversion layer LCL2.

The first and second diffusion layers DF1 and DF2 are disposed opposite to, e.g., to face, each other. The base substrate BS, the barrier layer BL, the first light conversion layer LCL1 and the second light conversion layer LCL2 are disposed between the first and second diffusion layers DF1 and DF2.

The first and second diffusion layers DF1 and DF2 may diffuse light. In one embodiment, for example, each of the first and second diffusion layers DF1 and DF2 may include acrylic resin, and a plurality of diffusion beads that is disposed in, e.g., distributed inside, the acrylic resin and diffuses light.

The base substrate BS is disposed on the diffusion layer DF1. The base substrate BS may include polyethylene terephthalate ("PET") film.

The barrier layer BL is disposed on the base substrate BS. The barrier layer BL may be an inorganic layer including an inorganic material. In one embodiment, for example, the barrier layer BL may include a silicon oxide (SiOx). However, the embodiment of the inventive concept is not limited thereto, and in an alternative embodiment, the barrier layer BL may include an inorganic layer and an organic layer including an organic material, which are stacked one on another.

The second light conversion layer LCL2 is disposed on the barrier layer BL, and the first light conversion layer LCL1 is disposed on the second light conversion layer LCL2. The second diffusion layer DF2 is disposed on the first light conversion layer LCL1.

As illustrated in FIG. 3, the first light conversion layer LCL1 includes a resin RIN (e.g., a resin layer) and a plurality of first quantum dots QDS1 accommodated or dispersed in the resin RIN.

The first quantum dots QDS1 may absorb the first light to generate light with a first color. In an embodiment, the first color may be a red color. In one embodiment, for example, the first quantum dots QDS1 have a predetermined size to absorb the first light having a blue wavelength band and to emit the light having a red wavelength band which corresponds to the first color. In such an embodiment, the first quantum dots QDS1 absorb the first light and generate red light.

Each of the first quantum dots QDS1 includes a first core C1, a first shell S1 which surrounds the first core, and a second shell S2 which surrounds the first shell S1. The first shell S1 may include an organic material. The second shell S2 may include an inorganic material. In one embodiment, for example, the second shells S2 may include a silicon oxide (SiOx).

Although not shown, the first core C1 includes a core particle and a protective shell surrounding the core particle. The core particle may include a semiconductor particle of Group II-IV, Group III-V, or the like. In one embodiment, for example, the core particle may include cadmium selenide (CdSe), cadmium telluride (CdTe), cadmium sulfide (CdS), or the like. The protective shell may include zinc sulfide.

External oxygen and water permeating from over the light conversion member 130 may permeate into the first light conversion layer LCL1. In one embodiment, for example, the second diffusion layer DF2 including an organic material and the resin RIN of the first light conversion layer LCL1 may absorb external oxygen and water.

When the second shell S2 is not used, external oxygen and water may permeate to the first quantum dots QDS1 through the resin RIN of the first light conversion layer LCL1. Accordingly, a chemical reaction (oxidization) may occur in the first quantum dots QDS1 exposed to oxygen and water, such that the performance of the light conversion of the first quantum dots QDS1 may be deteriorated.

In an embodiment, each of the first quantum dots QDS1 includes the second shells S2 including an inorganic material and surrounding the first shell S1 and first quantum dot QDS1, such that the first quantum dots QDS1 of the first light conversion layer LCL1 may be effectively protected from the external oxygen and water.

As illustrated in FIG. 4, the second light conversion layer LCL2 includes a resin RIN and a plurality of second quantum dots QDS2 accommodated or dispersed in the resin RIN.

The second quantum dots QDS2 may absorb the first light to generate light with a second color. In an embodiment, the second color may be a green color. In one embodiment, for example, the second quantum dots QDS2 may have a predetermined size to absorb the first light having a blue wavelength band and to emit the second light having a green wavelength band which corresponds to the second color. In such an embodiment, the second quantum dots QDS2 absorb the first light to generate green light.

Fluorescent light generated from the quantum dots has a shorter wavelength as the particle size of the particles of the quantum dots become smaller, and has a longer wavelength as the particles of the quantum dots become larger. Accordingly, in an embodiment, the sizes of the first quantum dots QDS1 are greater than those of the second quantum dots QDS2. Herein, the size of a particle may mean a width or a diameter of the particle.

Each of the second quantum dots QDS2 includes a second core C2 and a first shell S1 surrounding the second core C2. The second core C2 may include a material substantially the same as that of the first core C1.

In an embodiment, where the sizes of the first quantum dots QDS1 are larger than those of the second quantum dots QDS2, the sizes of the first cores C1 may be larger the sizes of the second cores C2. The sizes of core particles of the first cores C1 may be larger the sizes of core particles of the second cores C2. The first shells S1 surrounding the second cores C2 include the same materials as the first shells S1 surrounding the first cores C1.

The barrier layer BL blocks external oxygen and water permeating from under the light conversion member 130 to protect the second light conversion layer LCL2. In one embodiment, for example, the first diffusion layer DF2 including an organic material, the base substrate BS and the resin RIN of the second light conversion layer LCL2 may absorb external oxygen and water.

When the barrier layer BL is not used, external oxygen and water may be provided to the second quantum dots QDS2 through the resin RIN of the second light conversion layer LCL2. The light conversion performance of the second quantum dots QDS2 exposed to oxygen and water may be deteriorated.

The barrier layer BL effectively prevents external oxygen and water from permeating to the second light conversion layer LCL2, such that the second quantum dots QDS2 in the second light conversion layer LCL2 may be protected from the external oxygen and water.

In an embodiment, as shown in FIG. 1, the light guide plate 140 is disposed under the first diffusion layer DF1 of the light conversion member 130. The optical sheet 120 is disposed over the second diffusion layer DF2 of the light conversion member 130.

The first light provided from the light guide plate 140 to the light conversion member 130 is diffused at the first diffusion layer DF1, and provided to the first and second light conversion layers LCL1 and LCL2 via the base substrate BS and the barrier layer BL.

The first quantum dots QDS1 of the first light conversion layer LCL1 absorb the first light to convert the first light into light with a red wavelength band. The first quantum dots QDS1 of the first light conversion layer LCL1 absorb the first light to convert the first light into light with a green wavelength band.

A portion of the first light is not absorbed by the first and second quantum dots QDS1 and QDS2. Accordingly, white light may be generated as a second light since lights of blue, green, and red wavelengths are mixed with each other in the light conversion member 130. The second light may be diffused at the second diffusion layer DF2 and provided to the optical sheet 120.

In an embodiment, as described above, each of the first quantum dots QDS1 is protected from external water and oxygen by the second shell S2 thereof. Accordingly, in such an embodiment, an additional barrier layer typically provided on the first light conversion layer LCL1 to protect the first quantum dots QDS1 may be omitted.

In an embodiment of the inventive concept, since the barrier layer is not provided on the first light conversion layer LCL1, manufacturing costs of the light conversion member 130 may be saved and the thickness of the light conversion member 130 may be reduced.

Figure 5:
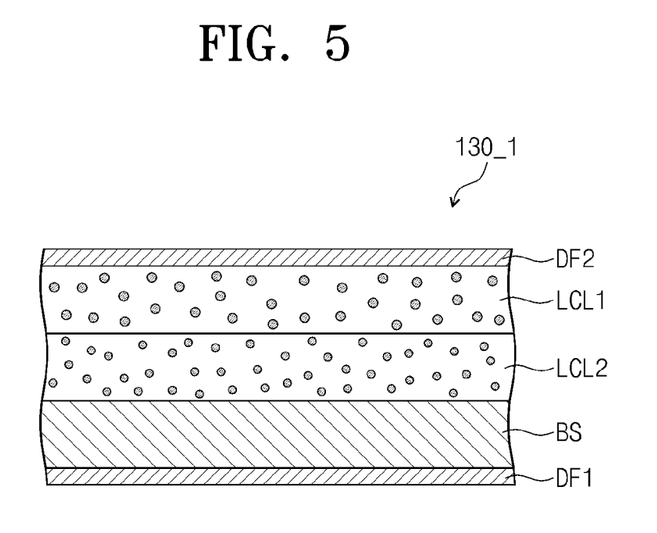
FIG. 5 is a cross-sectional view illustrating a cross-section of a light conversion member according to an alternative embodiment of the inventive concept.
Figure 6:
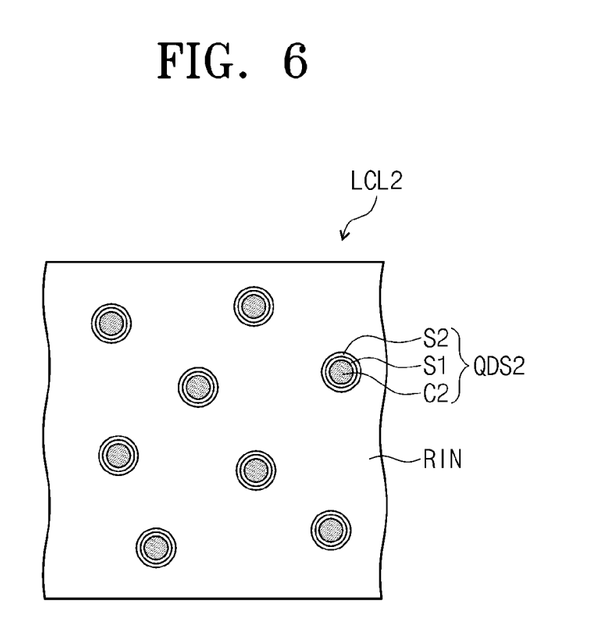
FIG. 6 is an enlarged view of a portion of a second light conversion layer illustrated in FIG. 5.

FIG. 5 is a cross-sectional view illustrating a cross-section of a light conversion member according to an alternative embodiment of the inventive concept. FIG. 6 is an enlarged view of a portion of a second light conversion layer illustrated in FIG. 5.

Referring to FIGS. 5 and 6, configurations of first and second diffusion layers DF1 and DF2, a base substrate BS, and a first light conversion layer LCL1 illustrated in FIG. 5 are substantially the same as the configurations of the first and second diffusion layers DF1 and DF2, the base substrate BS, and the first light conversion layer LCL1 illustrated in FIG. 2. Accordingly, any repetitive detailed description for the configurations of the first and second diffusion layers DF1 and DF2, the base substrate BS, and the first light conversion layer LCL1 illustrated in FIG. 5 may be omitted or simplified.

In such an embodiment, a second light conversion layer LCL2 is disposed on the base substrate BS. Unlike an embodiment of the light conversion member 130 described above with reference to FIG. 2, a light conversion member 130_1 according to an alternative embodiment may not include a barrier layer BL.

In such an embodiment, as illustrated in FIG. 6, each of second quantum dots QDS2 of the second light conversion layer LCL2 includes a second core C2, a first shell S1 surrounding the second core C2, and a second shell S2 surrounding the first shell S1.

In such an embodiment, the first shell S1 includes an organic material, and the second shell S2 includes an inorganic material. That is, unlike an embodiment of the light conversion member 130 described above with reference to FIG. 2, each of the second quantum dots QDS2 of the light conversion member 130_1 further includes the second shell S2 surrounding the first shell S1.

External oxygen and water permeating from under the light conversion member 130_1 may permeate the second light conversion layer LCL2. The second shell S2 of the each of the second quantum dots QDS2 blocks external oxygen and water, such that the second quantum dot QDS2 of the second light conversion layer LCL2, which is surrounded by the second shell S2, may be protected from the external oxygen and water.

The first and second quantum dots QDS1 and QDS2 are protected from external water and oxygen by the second shells S2 thereof. Accordingly, in such an embodiment, the barrier layers that are typically provided under the second light conversion layer LCL2 and over the first light conversion layer LCL1, respectively, to protect the first and second quantum dots QDS1 and QDS2 may be omitted.

In such an embodiment, since the barrier layers are not respectively provided under the second light conversion layer LCL2 and over the first light conversion layer LCL1, manufacturing costs of the light conversion member 130_1 may be saved and the thickness of the light conversion member 130_1 may be reduced.

Typically, the first and second quantum dots QDS1 and QDS2 are protected from external water and oxygen by the barrier layers respectively disposed under the second light conversion layer LCL2 and over the first light conversion layer LCL1. However, in embodiment described above with reference to FIGS. 2 and 5, at least one of the barrier layers may be omitted.

As a result, an embodiment of the light conversion members 130 or 130_1 and a display apparatus 100 including the light conversion members 130 or 130_1 may reduce manufacturing costs and thickness thereof by omitting at least one of typical barrier layers.

Figure 7:
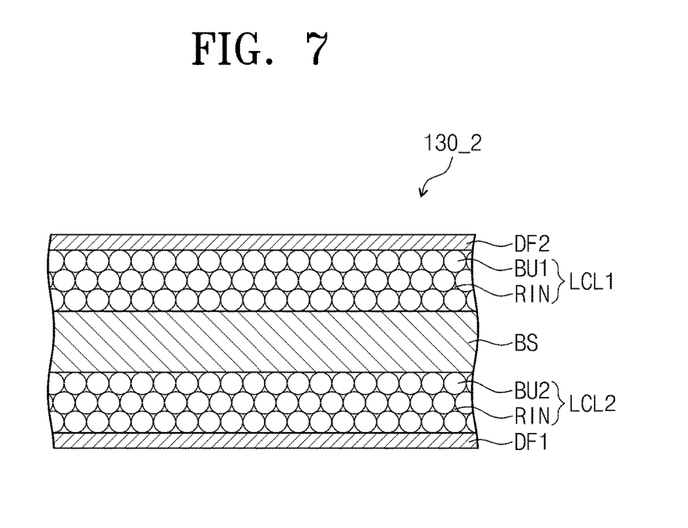
FIG. 7 is a cross-sectional view illustrating a cross-section of a light conversion member according to another alternative embodiment of the inventive concept.
Figure 8:
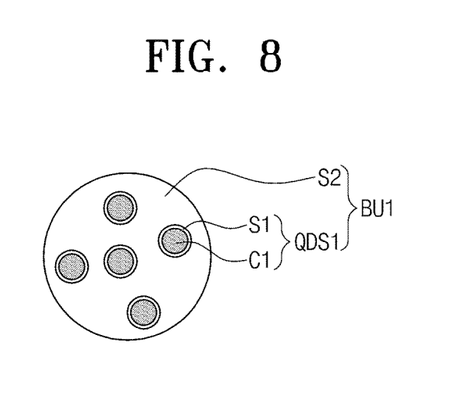
FIG. 8 is a view illustrating a first bulk units illustrated in FIG. 7.
Figure 9:
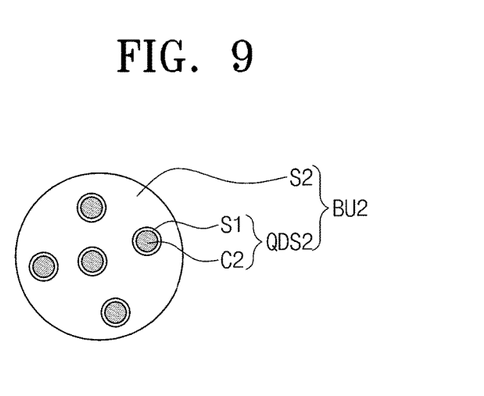
FIG. 9 is a view illustrating a second bulk unit illustrated in FIG. 7.

FIG. 7 is a cross-sectional view illustrating a cross-section of a light conversion member according to another alternative embodiment of the inventive concept. FIG. 8 is a view illustrating a first bulk units illustrated in FIG. 7. FIG. 9 is a view illustrating a second bulk unit illustrated in FIG. 7.

Referring to FIGS. 7, 8, and 9, the configurations of first and second diffusion layers DF1 and DF2 and a base substrate BS illustrated in FIG. 7 are substantially the same as the configurations of the first and second diffusion layers DF1 and DF2 and the base substrate BS illustrated in FIG. 2. Accordingly, any repetitive detailed description for the configurations of the first and second diffusion layers DF1 and DF2 and the base substrate BS illustrated in FIG. 7 may be omitted.

In an embodiment, as shown in FIG. 7, a second light conversion layer LCL2 is disposed under the base substrate BS, and the first diffusion layer DF1 is disposed under the second light conversion layer LCL2. In such an embodiment, a first light conversion layer LCL1 is disposed over the base substrate BS, and the second diffusion layer DF2 is disposed over the first light conversion layer LCL1.

The first light conversion layer LCL1 includes a resin RIN and a plurality of first bulk units BU1 accommodated in the resin RIN. The first bulk units BU1 may define a plurality of layers stacked one on another over the base substrate BS.

In such an embodiment, as illustrated in FIG. 8, each of the first bulk units BU1 includes a plurality of first quantum dots QDS1 for generating red light and a second shell S2 accommodating the first quantum dots QDS1.

Each of the first quantum dots QDS1 include a first core C1 and a first shell S1 surrounding the first core C1. The first quantum dots QDS1 illustrated in FIG. 8 have the same configuration as a configuration in which the second shell S2 is removed from the quantum dots QDS1 illustrated in FIG. 3.

The second light conversion layer LCL2 includes a resin RIN and a plurality of second bulk units BU2 accommodated in the resin RIN. The second bulk unit BU2 may define a plurality of layers stacked one on another under the base substrate BS.

In such an embodiment, as illustrated in FIG. 9, each of the second bulk units BU2 include a plurality of second quantum dots QDS1 for generating green light and a second shell S2 accommodating the second quantum dots QDS2. The second quantum dots QDS2 have substantially the same configuration as the second quantum dots QDS2 illustrated in FIG. 4.

The first shells S1 of the first and second bulk units BU1 and BU2 illustrated in FIGS. 8 and 9 include an organic material. In such an embodiment, the second shells S2 of the first and second bulk units BU1 and BU2 may include an inorganic material and have a spherical shape. However, the embodiment of the inventive concept is not limited thereto, and in an alternative embodiment, the second shells S2 may have various shapes, such as a triangular pyramid, a pyramid, or a rectangular parallelepiped, for example.

In such an embodiment of the inventive concept, the first and second quantum dots QDS1 and QDS2 of the first and second bulk units BU1 and BU2 are protected from external water and oxygen by the second shells S2 therearound. Accordingly, in such an embodiment, the barrier layers that are typically provided over the first light conversion layer LCL1 and under the second light conversion layer LCL2, respectively, to protect the first and second quantum dots QDS1 and QDS2 may be omitted.

Figure 10:
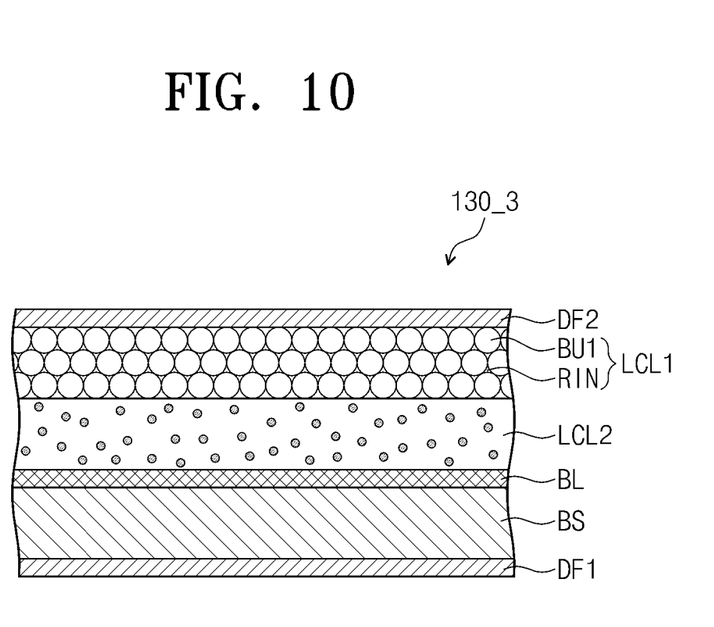
FIG. 10 is a cross-sectional view illustrating a cross-section of a light conversion member according to still another alternative embodiment of the inventive concept.

FIG. 10 is a cross-sectional view illustrating a cross-section of a light conversion member according to another alternative embodiment of the inventive concept.

Referring to FIG. 10, configurations of first and second diffusion layers DF1 and DF2, a base substrate BS, a barrier layer BL, and a second light conversion layer LCL2 illustrated in FIG. 10 are substantially the same as the configurations of the first and second diffusion layers DF1 and DF2, the base substrate BS, a barrier layer BL, and the second light conversion layer LCL2 illustrated in FIG. 2. Also, the configuration of a first light conversion layer LCL1 illustrated in FIG. 10 is substantially the same as the configuration of the first light conversion layer LCL1 illustrated in FIG. 7.

Accordingly, any repetitive detailed description for the configurations of the first and second diffusion layers DF1 and DF2, the base substrate BS, the barrier layer BL, and the first light conversion layer LCL1 illustrated in FIG. 10 may be omitted.

Unlike an embodiment of the inventive concept described above with reference to FIG. 7, in an alternative embodiment, as shown in FIG. 10, first bulk units BU1 of the first light conversion layer LCL1 defined a plurality of layers stacked one on another on the second light conversion layer LCL2.

In such an embodiment of the inventive concept, the first quantum dots QDS1 of the first bulk units BU1 are protected from external water and oxygen by the second shells S2 thereof. Accordingly, a barrier layer is not provided on the first light conversion layer LCL1 to protect the first quantum dots QDS1.

As a result, an embodiment of the light conversion members 130_2 or 130_3 described above with reference to FIGS. 7 and 10 and a display apparatus 100 including such an embodiment of the light conversion members 130_2 or 130_3 may reduce manufacturing costs and thickness thereof by excluding at least one of typical barrier layers.

Figure 11:
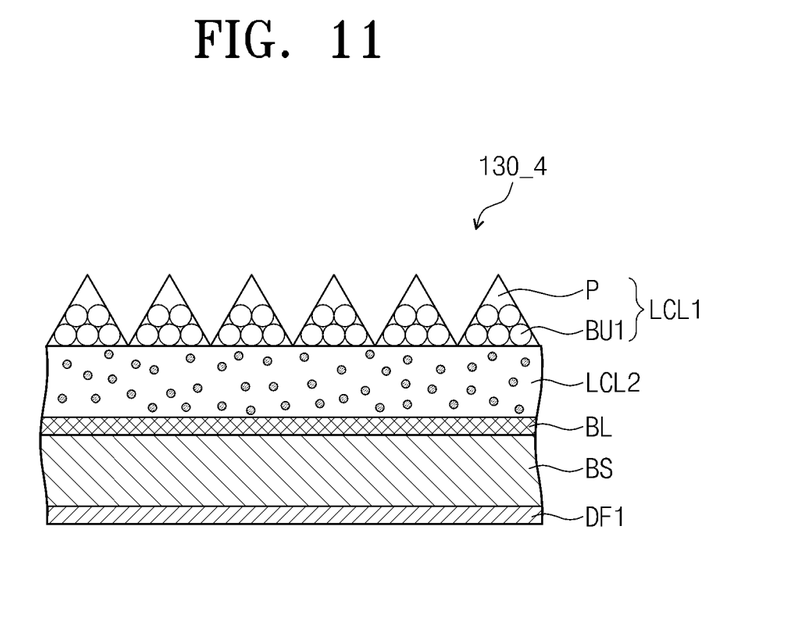
FIG. 11 is a cross-sectional view illustrating a cross-section of a light conversion member according to still another alternative embodiment of the inventive concept.

FIG. 11 is a cross-sectional view illustrating a cross-section of a light conversion member according to another alternative embodiment of the inventive concept.

Referring to FIG. 11, the configurations of first and second diffusion layers DF1 and DF2, a base substrate BS, a barrier layer BL, and a second light conversion layer LCL2 illustrated in FIG. 11 are substantially the same as the configurations of the first and second diffusion layers DF1 and DF2, the base substrate BS, a barrier layer BL, and the second light conversion layer LCL2 illustrated in FIG. 2.

Also, the configuration of first bulk units BU1 of first light conversion layer LCL1 illustrated in FIG. 11 is substantially the same as the configuration of the first bulk units BU1 of the first light conversion layer LCL1 illustrated in FIG. 7.

Accordingly, any repetitive detailed description for the configurations of the first diffusion layer DF1, the base substrate BS, the barrier layer BL, the second light conversion layer LCL2, and the first bulk units BU1 illustrated in FIG. 11 may be omitted.

In an embodiment shown in FIG. 11, as described above, a first light conversion layer LCL1 is disposed on the second light conversion layer LCL2. In such an embodiment, the first light conversion layer LCL1 includes a plurality of protruding patterns P and a portion of the first bulk units BU1 accommodated in the protruding patterns P. The protruding patterns P include a resin. That is, the first bulk units BU1 are accommodated in the resin defined by the protruding patterns P. The protruding patterns P have a shape of a peak.

As similar to a prism sheet, the protruding patterns P having a shape of a peak or a prism shape may collect light in an upward direction by refracting the light like, and therefore the light passing through the protruding patterns P may have a uniform brightness distribution and upwardly proceed. Accordingly, light conversion member 130 may provide optical sheet 120 with a second light having a uniform brightness distribution.

In such an embodiment of the inventive concept, the first quantum dots QDS1 of the first bulk units BU1 are protected from external water and oxygen by the second shells S2. Accordingly, in such an embodiment, a barrier layer may not be provided on the first light conversion layer LCL1 to protect the first quantum dots QDS1.

Figure 12:
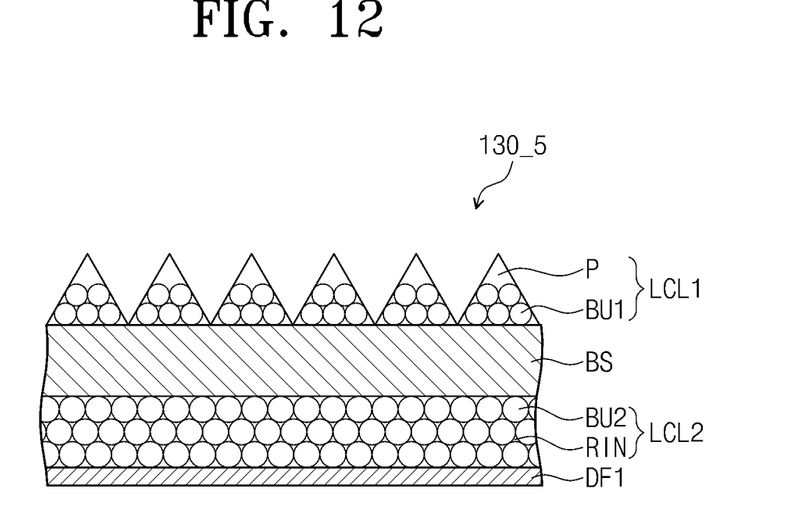
FIG. 12 is a cross-sectional view illustrating a cross-section of a light conversion member according to still another alternative embodiment of the inventive concept.

FIG. 12 is a cross-sectional view illustrating a cross-section of a light conversion member according to another alternative embodiment of the inventive concept.

Referring to FIG. 12, the configurations of first diffusion layer DF1, a second light conversion layer LCL2, and a base substrate BS illustrated in FIG. 12 are substantially the same as the configurations of the first diffusion layer DF1, the second light conversion layer LCL2, the base substrate BS illustrated in FIG. 7.

Also, the configuration of a first light conversion layer LCL1 illustrated in FIG. 12 is substantially the same as the configuration of the first light conversion layer LCL1 illustrated in FIG. 11. Accordingly, any repetitive detailed description for the configurations of the first diffusion layer DF1, the base substrate BS, and the first and second light conversion layers LCL1 and LCL2 illustrated in FIG. 12 may be omitted.

In such an embodiment shown in FIG. 12, as described above, the first and second quantum dots QDS1 and QDS2 of the first and second bulk units BU1 and BU2 are protected from external water and oxygen by the second shells S2. Accordingly, barrier layers may not be provided under the second light conversion layer LCL2 and over the first light conversion layer LCL1 to protect the first and second quantum dots QDS1 and QDS2.

As a result, in such an embodiment of the light conversion members 130_4 and 130_5 shown in FIGS. 11 and 12 and a display apparatus 100 including the such an embodiment of the light conversion members 130_4 and 130_5 may reduce manufacturing costs and thickness by excluding at least one of typical barrier layers having a vertically symmetrical structure.

As described herein, an embodiment of a light conversion member and a display apparatus including such an embodiment of the light conversion member may reduce manufacturing costs and thickness by omitting at least one barrier layer from among typical barrier layers having a vertically symmetrical structure.

While exemplary embodiments are described above, a person skilled in the art may understand that many modifications and variations may be made without departing from the spirit and scope of the present invention defined in the following claims. Also, embodiments disclosed in the present disclosure are not intended to limit the technical spirit of the present invention and the following claims and all technical spirits falling within equivalent scope are construed as being included in the scope of rights of the present invention.

What is claimed is:

1. A light conversion member, comprising:
a base substrate;
a first light conversion layer disposed on the base substrate, wherein the first light conversion layer comprises a plurality of first quantum dots which converts first light into light with a first color; and
a second light conversion layer disposed between the base substrate and the first light conversion layer, wherein the second light conversion layer comprises a plurality of second quantum dots which converts the first light into light with a second color,
wherein each of the first quantum dots comprises:
a first core which converts the first light into light with the first color;
a first shell which surrounds the first core and comprises an organic material; and
a second shell which surrounds the first shell and comprises an inorganic material, and
a barrier layer is not provided over the first light conversion layer.

2. The light conversion member of claim 1, wherein each of the second quantum dots comprises:
a second core which converts the first light into light with a second color; and
a first shell which surrounds the second core and comprises an organic material.

3. The light conversion member of claim 2, wherein a size of the first core is greater than a size of the second core.

4. The light conversion member of claim 2, wherein
the first color is red,
the second color is green, and
the first light is blue light.

5. The light conversion member of claim 2, further comprising:
a first diffusion layer disposed under the base substrate;
a second diffusion layer disposed over the first light conversion layer; and
a barrier layer disposed between the base substrate and the second light conversion layer,
wherein the barrier layer comprises an inorganic material.

6. The light conversion member of claim 1, wherein the second shell comprises a silicon oxide.

7. The light conversion member of claim 1, wherein each of the first and second light conversion layers further comprises a resin which accommodates the first or second quantum dots.

8. The light conversion member of claim 1, wherein each of the second quantum dots comprises:
a second core which converts the first light into light with a second color;
a first shell which surrounds the second core and comprises an organic material; and
a second shell which surrounds the first shell and comprises an inorganic material.

9. A light conversion member comprising:
a first diffusion layer;
a base substrate disposed on the first diffusion layer;
a barrier layer disposed on the base substrate;
a first light conversion layer disposed on the barrier layer, wherein the first light conversion layer comprises a plurality of first bulk units which converts first light into light with a first color; and
a second light conversion layer disposed between the base substrate and the first light conversion layer, wherein the second light conversion layer comprises a plurality of second quantum dots which converts the first light into light with second color,
wherein each of the first bulk units comprises:
a plurality of first quantum dots, wherein each of the first quantum dots comprises a first core which converts the first light into light with the first color, and a first shell which surrounds the first core and comprises an organic material;
a second shell which accommodates the first quantum dots and comprises an inorganic material, and
a barrier layer is not provided over the first light conversion layer.

10. The light conversion member of claim 9, wherein each of the first and second light conversion layers further comprises a resin which accommodates the first bulk units and the second quantum dots, and
the first bulk units define a plurality of layers stacked one on another on the second light conversion layer.

11. The light conversion member of claim 9, wherein each of the second quantum dots comprises:
a second core which converts the first light into light with the second color; and
a first shell which surrounds the second core and including an organic material,
wherein
a size of the first core is greater than a size of the second core,
the first color is red,
the second color is green, and
the first light is blue light.

12. The light conversion member of claim 9, further comprising:
a second diffusion layer disposed on the first light conversion layer.

13. The light conversion member of claim 9, wherein
the first light conversion layer further comprises a plurality of protruding patterns comprising the resin and having a shape of a peak, and
each of the protruding patterns accommodates a portion of the first bulk units.

14. A light conversion member, comprising:
a base substrate;
a first light conversion layer disposed on the base substrate, wherein the first light conversion layer comprises a plurality of first bulk units which converts first light into light with a first color;
a second light conversion layer disposed under the base substrate, wherein the second light conversion layer comprises a plurality of second bulk units which converts the first light into light with second color; and
a first diffusion layer disposed under the second light conversion layer,
wherein each of the first bulk units comprises:
a plurality of first quantum dots, wherein each of the first quantum dots comprises a first core which convert the first light into light with the first color, and a first shell which surround the first core; and a second shell which accommodates the first quantum dots, and wherein each of the second bulk units comprises:

a plurality of second quantum dots, wherein each of the second quantum dots comprises a second core which convert the first light into light with the second color, and a first shell which surround the second core; and a second shell which accommodates the second quantum dots, wherein each of the first shells of the first and second bulk units comprises an organic material, wherein each of the second shells of the first and second bulk units comprises an inorganic material, and barrier layers are not provided under the second light conversion layer and over the first light conversion layer.

15. The light conversion member of claim 14, wherein each of the first and second light conversion layers further comprises a resin which accommodates the first bulk units and the second bulk units, the first bulk units define a plurality of layers stacked one on another on the base substrate, and the second bulk units define a plurality of layers stacked one on another under the base substrate.

16. The light conversion member of claim 14, further comprising:

a second diffusion layer disposed on the first light conversion layer.

17. The light conversion member of claim 14, wherein the first light conversion layer further comprises a plurality of protruding patterns comprising the resin and having a shape of a peak, and each of the protruding patterns accommodates a portion of the first bulk units.

18. A display apparatus, comprising:

a light source which generates first light;

a light guide plate which upwardly guides the first light;

a light conversion member disposed on the light guide plate and which converts the first light into a second light; and a display panel which displays an image using the second light received from the light conversion member, wherein the light conversion member comprises:

a base substrate;

a first light conversion layer disposed on the base substrate, wherein the first light conversion layer comprises a plurality of first quantum dots which convert the first light into light with a first color; and a second light conversion layer disposed between the base substrate and the first light conversion layer, wherein the second light conversion layer comprises a plurality of second quantum dots which convert the first light into light with a second color, wherein each of the first quantum dots comprises:

a first core which converts the first light into light with the first color;

a first shell which surrounds the first core and comprises an organic material; and a second shell which surrounds the first shell and comprises an inorganic material, and wherein each of the second quantum dots comprises:

a second core which converts the first light into light with the second color; and a first shell which surrounds the second core and comprises an organic material, and a barrier layer is not provided over the first light conversion layer.

19. The display apparatus of claim 18, further comprising:

a first diffusion layer disposed under the base substrate;

a second diffusion layer disposed over the first light conversion layer; and a barrier layer disposed between the base substrate and the second light conversion layer, wherein the barrier layer comprises an inorganic material.

* * * * *